United States Patent [19]
Galand

[11] Patent Number: 5,167,190
[45] Date of Patent: Dec. 1, 1992

[54] MOBILE ENGINE-CARRIER CONVERTIBLE BETWEEN ROAD AND RAIL USE WITH FOLDING SWAN-NECK AND RAMPS FOR ATTACHING TO RAILWAY BOGIES

[75] Inventor: Michel Galand, Marnésia, France

[73] Assignee: Societe Lohr Industrie, Hangenbieten, France

[21] Appl. No.: 608,063

[22] Filed: Oct. 31, 1990

[30] Foreign Application Priority Data

Oct. 31, 1989 [FR] France ............................. 89 14480

[51] Int. Cl.⁵ .............................................. B61F 13/00
[52] U.S. Cl. ............................... 105/215.2; 104/32.1; 105/159; 105/199.1; 280/417.1
[58] Field of Search ..................... 104/32.1; 105/72.2, 105/158.1, 158.2, 159, 215.1, 215.2, 363, 463.1, 199.1; 280/417.1, 418, 441.2; 414/537, 480

[56] References Cited

U.S. PATENT DOCUMENTS

| | | |
|---|---|---|
| 3,733,089 | 5/1973 | Goecke et al. .................. 280/417.1 |
| 3,762,337 | 10/1973 | McKeon et al. .............. 105/215.2 X |
| 4,364,315 | 12/1982 | Beatty ............................... 105/215.2 |
| 4,372,727 | 2/1983 | Fredrickson et al. .............. 414/537 |
| 4,433,853 | 2/1984 | Swaim ............................ 280/417.1 |
| 4,448,132 | 5/1984 | Beatty .............................. 105/159 X |
| 4,792,274 | 12/1988 | Cockram ............................ 414/537 |
| 4,961,676 | 10/1990 | Gourdin ........................... 105/215.2 |

FOREIGN PATENT DOCUMENTS

| | | | |
|---|---|---|---|
| 1035151 | 4/1933 | France | 105/159 |
| 1368963 | 6/1964 | France | 105/159 |

*Primary Examiner*—Robert J. Oberleitner
*Assistant Examiner*—S. Joseph Morano
*Attorney, Agent, or Firm*—Schwartz & Weinrieb

[57] ABSTRACT

In a road-transportable trailer having a connecting arm (11) of a "swan neck" type, and including an oblique arm (15), followed by a branch (17), a forward extremity of the former including a lower support rack (16), and a retractable telescopic support arm (24) disposed therein, and further including a plurality of access ramps (7, 8), the improvement relates to the facts that the branch (17) of the connecting arm (11) is foldable, is structured on an upper surface thereof as a projecting support member (20), and is adapted to be made rigid with the upper deck (35) of a forward bogie (27). A pivoting mechanism is provided which may be locked into a normally horizontal position, and is adapted so as to be in a position of alignment with an upper deck of a rear bogie (28).

16 Claims, 5 Drawing Sheets

MOBILE ENGINE-CARRIER CONVERTIBLE BETWEEN ROAD AND RAIL USE WITH FOLDING SWAN-NECK AND RAMPS FOR ATTACHING TO RAILWAY BOGIES

FIELD OF THE INVENTION

The present invention relates to a mobile engine-carrier convertible into a wagon adapted for rail transport.

BACKGROUND OF THE INVENTION

The present invention is concerned in particular with trailer-type carriers for heavy machinery, such as machinery for public works, agricultural machines, and the like.

A pivotable connecting mechanism of this type of trailer to the prime mover is implemented in the form of a curved connecting arm of large dimensions, conventionnaly called a "swan neck".

Such an arm is of large dimensions, because of the strong forces acting on the prime mover by the weight of the transported engine. Furthermore, the arm is curved, so as to permit a sufficient lowering thereof in the case of any uneven ground, or due to a ground criss-crossed by troughs, and/or due to other unevenness of the terrain.

For the aforesaid reasons the arm connecting the trailer with the prime mover is conventionally called an unhooked "swan neck".

In order to permit access to the platform of the trailer, the trailer is conventionally equipped on its rear with lowerable access ramps for each wheel of any wheel-train of the engines transported.

For the same reasons of required mechanical strength, the ramps are made to be heavy and strong.

SUMMARY OF THE INVENTION

For reasons of utilization, and particularly of economy of transport in case of delivery or transit between two locations, it has been deemed desirable, and even necessary to be able to convert such transportable trailers quickly into a wagon, so as to permit their use on rails, and so as to benefit from all the advantages of transportation by rail.

The object of the present invention then is precisely to convert a transportable trailer into a wagon, so as to carry engines and heavy rolling stock, such as those envisaged and described hereinabove.

The difficulty overcome by the present invention bears precisely on the conversion of a trailer into a wagon by the unique utilization of simple means, while still conserving and maintaining the structures and devices usually employed on the upper decks of bogies.

For this purpose the present invention relates to a trailer adapted for road transport which may be converted into a wagon, and wherein the branch of the connecting arm between the prime mover and the trailer is lowerable towards the ground and foldable, being structured on an upper surface thereof as a projecting support member and adapted to be made rigid with, or locked to the upper deck of a forward bogie, and wherein the trailer further includes a pivotable mechanism lockable into a normally horizontal position, and adapted so as to be in a position of alignment with an upper deck of a rear bogie, and wherein the access ramps are also immobilized in a horizontal position on the upper carrier deck of the rear bogie.

Numerous advantages are available from the convertible trailer according to the present invention, such as those enumerated below:

- multiple advantages as far as use is concerned, by avoiding the serious disadvantages of carriers designed for road transport, and benefiting from the rapidity and quality of rail transport;
- simple and rapid conversion, which does not require any external lifting or handling means;
- work in connection with the conversion of the trailer does not present any technical difficulty whatsoever;
- simplicity of the adaption means, which do not include any intermediate detached or cooperating piece.

BRIEF DESCRIPTION OF THE DRAWING

The technical characteristics and other advantages of the present invention will be evident from the following description, which purely provides an example, and is non-limiting as far as implementation is concerned. With reference to the accompanying drawings.

DESCRIPTION OF THE PREFERRED EMBODIMENTS

Figure 1:
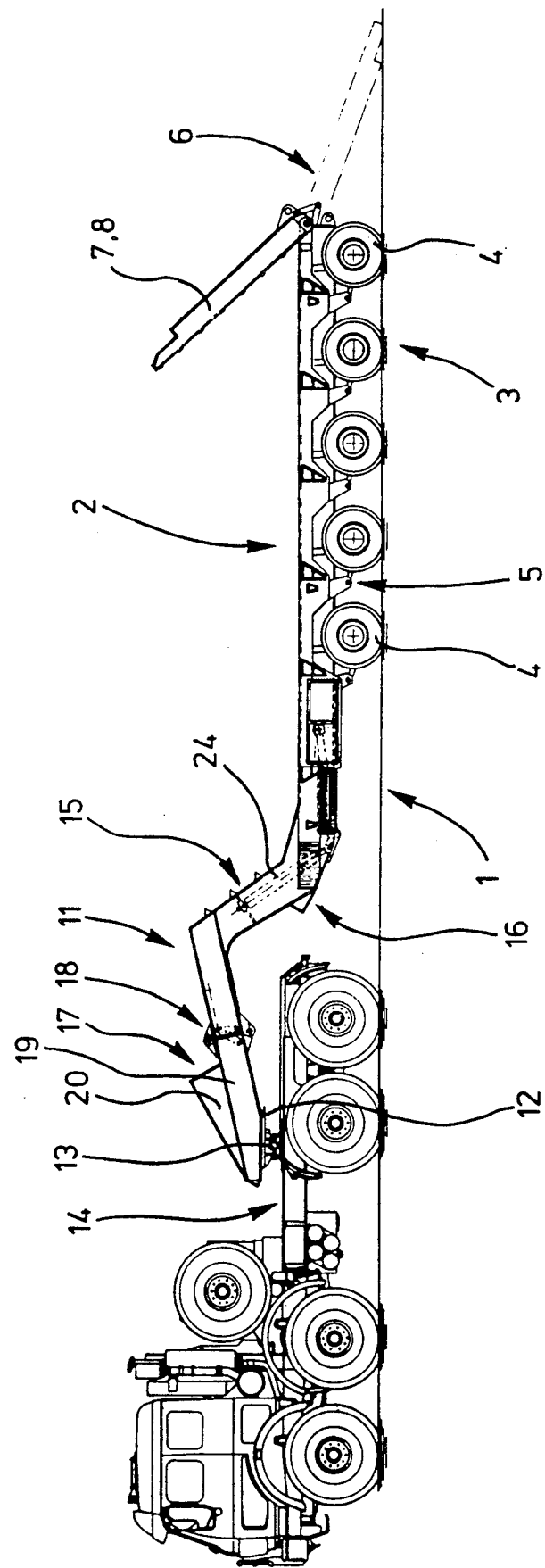
FIG. 1 is a side elevational view of the trailer, according to the present invention in its road-transport mode.

There will be described hereinafter the trailer as a carrier of machinery in the road-transport mode.

It will be understood that the invention applies to various other types of trailers, for which a technical solution similar to that of the present invention is available.

For this purpose the general inventive idea includes the incorporation in the forward mechanical connecting arm of the trailer of a pivoting mechanism so as to make it lowerable towards the ground, and to make the rear access ramps movable into a horizontal position, so as to establish a mechanical rigid link of the trailer with the forward and rear bogies.

The aforesaid inventive idea also includes the attachment of a projecting member forming a support to the forward mechanical connecting arm adapted so as to make it rigid with the upper deck of the forward bogie, or alternately to so structure the profile of an end of the connecting arm as to conform with the aforesaid inventive idea.

A trailer 1, for example, a machine-carrier, particularly for powerful and heavy engines, such as vehicles, public-work engines, agricultural machines and others, includes a platform 2, mounted by means of a hydraulic or pneumatic supension 5 of considerable flexure, on a wheel-train 3, for example, five independent wheel pairs, such as 4, which permits complete retraction of the wheel-train to a carrying position, but also permits elevation of the carrier platform of the trailer to an elevated position, after it has been converted to a wagon suitable for rail transport.

If the retraction mechanism of this suspension does not allow attainment of the necessary level for the platform, this function can be carried out by means of a rear telescopic support.

The trailer 1 is equipped on its rear with an access passage, typically formed by two inclined ramps 7 and 8 for each wheel-series of the respective sides of a wheel-train. Each of the ramps 7 and 8 may be changed from an access position to a retracted position by means of a pivot mechanism 9, such as shown, for example, in FIG. 5, by means of which each ramp is connected to the rear of the platform 2.

By means of one of the characteristics of the present invention, the ramps 7 and 8 may be locked into a horizontal position representing an extension of the plane of the platform 2 by means of a ramp-lock, for example by means of a bolt or spindle 10.

Other locking-type immobilization means can be envisaged, for example a ratchet-type lock.

According to the present invention, the ramps 7 and 8 demonstrate a general-type technique, so that the ramps are adapted to be immobilized on the upper deck or carrier structure of each bogie. The ramps 7 and 8 include a type of disconnecting mechanism facilitating oblique contact with the ground.

The trailer is equipped at its front end with a connecting arm 11 linking the trailer to a prime mover, which connecting arm 11 is traditionally named a "swan neck", and carries at an end thereof a support 12 equipped with a peg 13, in turn cooperating with a rack or seat 14 on the prime mover, so that the trailer can be taken in tow.

The arm 11, which conforms to the characteristics of this type of trailer, is detachable therefrom in accordance with the aforesaid "swan neck" type, and by reason of its particular shape, permits an important disengagement from the rear of the prime mover.

The pivotable linking arm 11 is made up of an inclined branch 15, whose lower surface is furnished with an inclined abutment and support 16, followed by a a branch 17, one end of which is connectable to the prime mover, as has already been indicated hereinabove.

Conforming to the invention, the branch 17 of the connecting arm 11 is implemented so that it can be folded, for example by means of a pivoting mechanism 18, including locking means, so that it can be locked into a position of alignment, permitting in turn lowering of its free extremity 19 towards the ground.

The lowerable extremity 19 of the branch 17, in turn, is formed on its upper surface with a wedge-like prismatic projection member 20 structured as a support, or is alternatively equipped with an equivalent retractable member, which can be immobilized on the carrier deck above the forward bogie.

Figure 4:
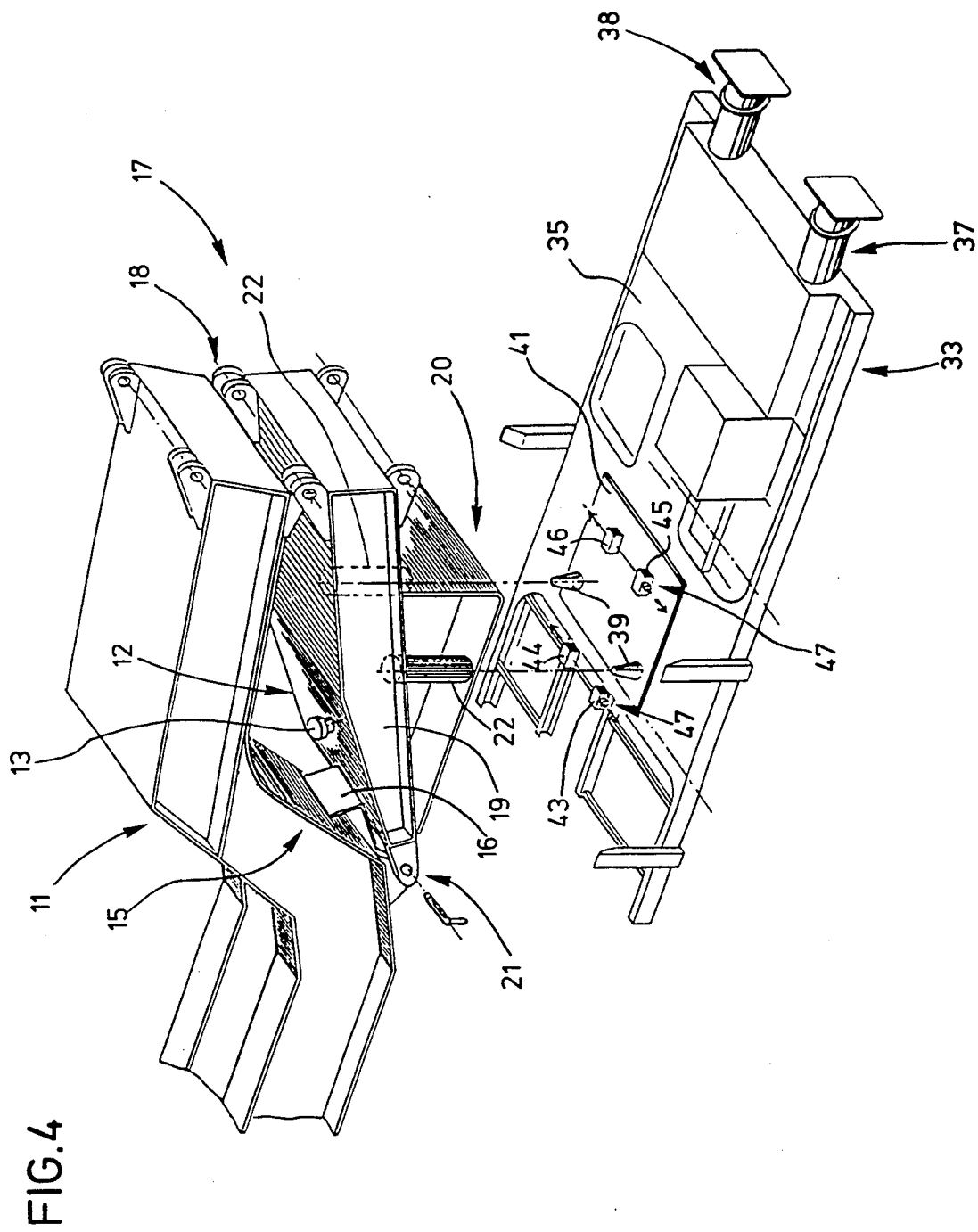
FIG. 4 is a simplified perspective view of the forward bogie, when the trailer is in the process of being rigidized so as to be adapted for rail transport.

The lowerable extremity 19 carries at an end or underside thereof a rapidly operable rigidization means 21, which may be made rigid with, or be locked onto either the base of the arm 15, or onto the supporting abutment 16, as can be seen in detail in FIG. 4.

This rigidization means 21 may be implemented either by a bolt, or by rendering a pivoting axle of the pivoting device immobile, or else by means commonly known as a "twist lock".

More particularly, the member or support piece 20 carries hollow cylindrical members 22 designed to cooperate with centering cones 39 provided on the upper deck of the front bogie so as to immobilize the same laterally.

Figure 2:
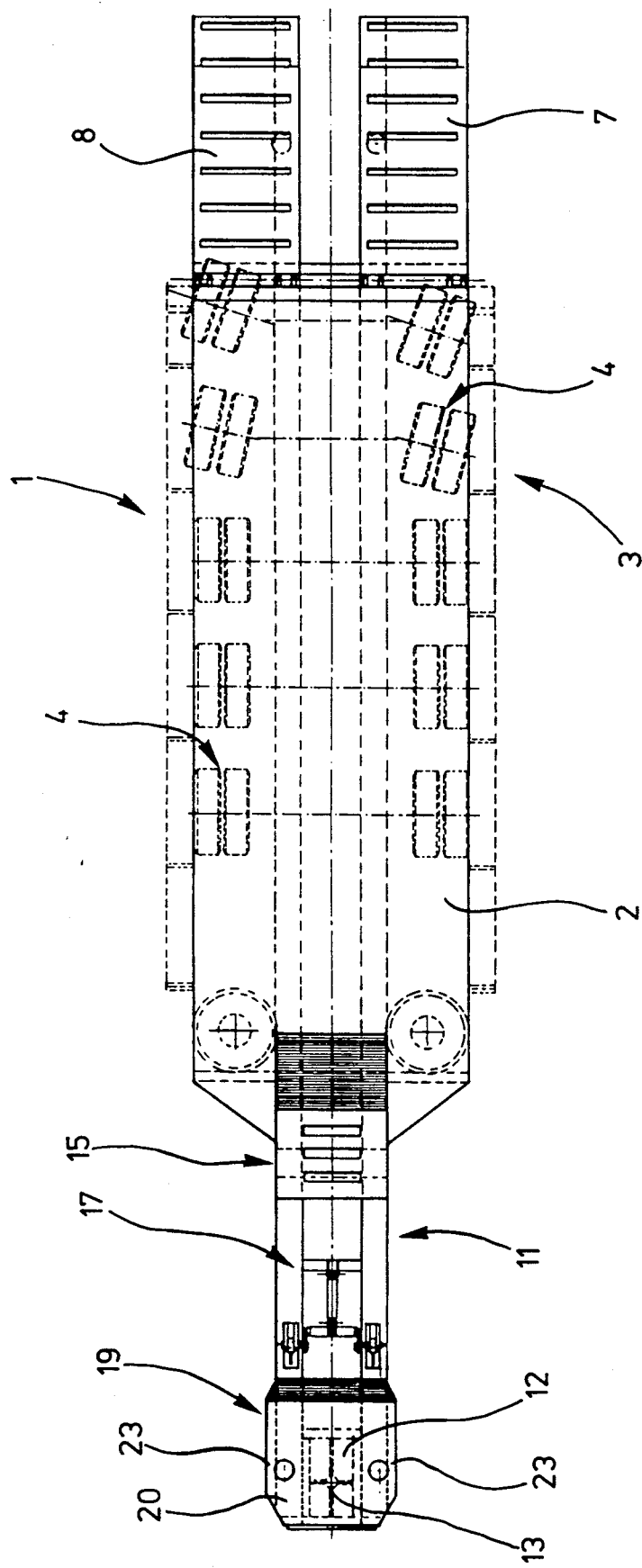
FIG. 2 is a plan view of the trailer shown in FIG. 1.

The member 20 is also provided with, as can be best seen from FIG. 2, with a double longitudinal border 23, formed by two longitudinal rims, which constitute the support surfaces for blockage means, as will be further described hereinbelow.

In the folded position, the lower retractable extremity 19 is immobilized through its support member 20 on the upper structure of the bogie, and is wedged onto its abutment member. It can be locked to the oblique branch 15 by means of the rapidly deployable rigidization means 21, including the lockable means 18, so as to render it immobile, for example, by tight fit, thus constituting a good mechanical adhesion.

The oblique branch 15 carries on its base and on a location proximate to the platform 2 of the trailer 1, a retractable telescopic assembly or mechanism 24, for example of the hydraulic type, utilized as a support point during the conversion phase, as will be described hereinafter.

Figure 5:
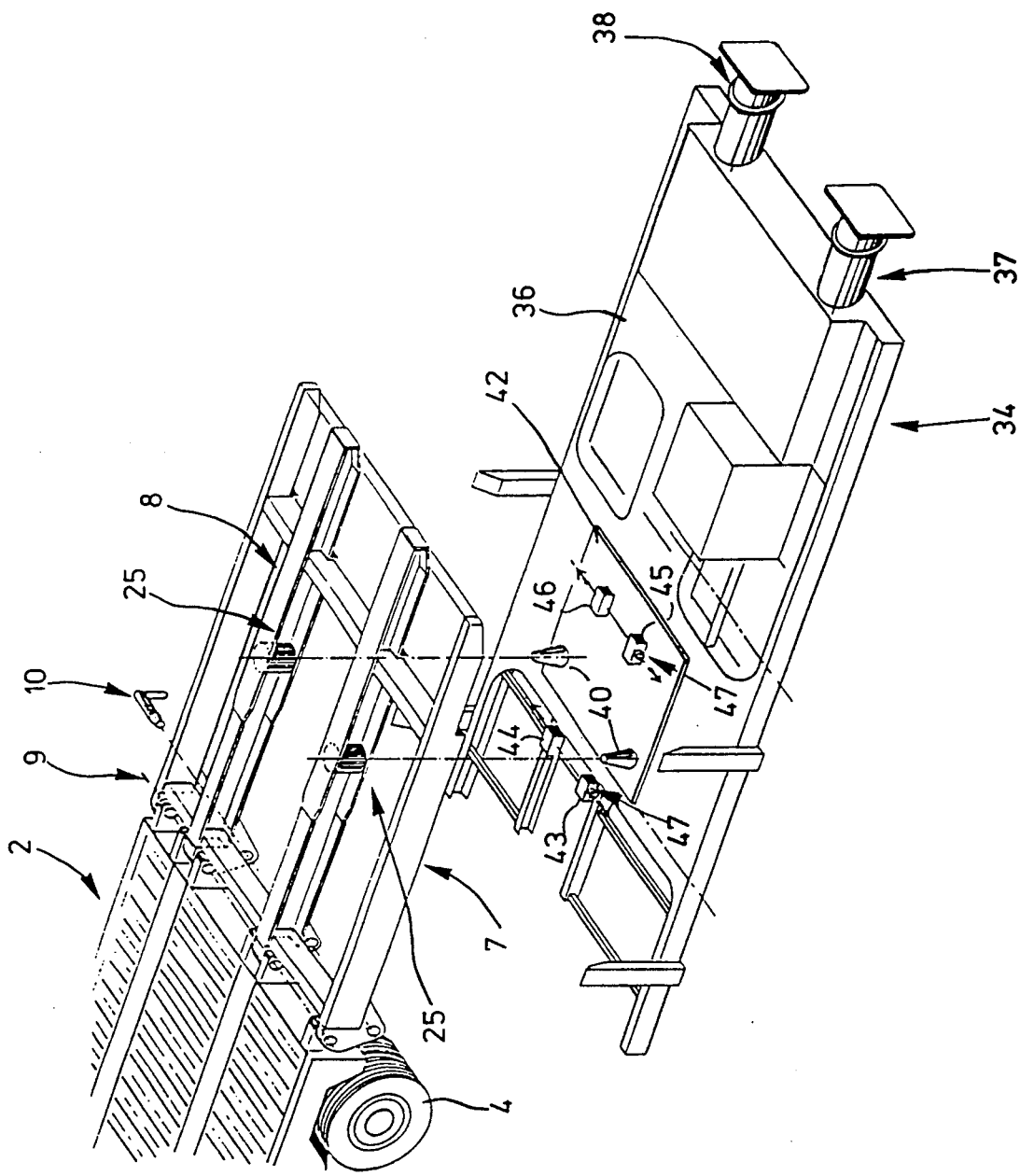
FIG. 5 is a simplified perspective view of the rear bogie, when the trailer is in the process of being rigidized so as to be adapted for rail transport.

According to a supplemental characteristic of the present invention, each rearwardly located ramp 7 or 8 is formed with a part-circular, or part-cylindrical groove, such as 25, designed to cooperate with the centering cones 40 provided on the deck or carrier structure of the rear bogie, as best seen in FIG. 5.

Figure 3:
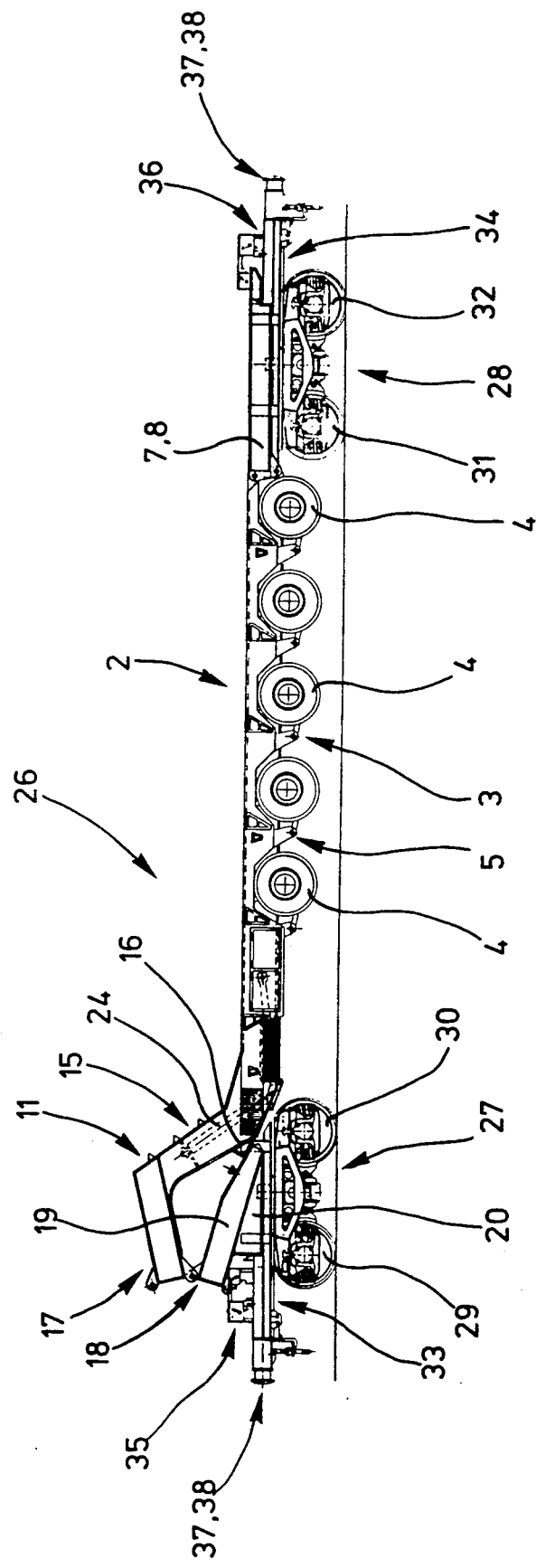
FIG. 3 is a side elevational view of the trailer, according to the present invention, suitable for rail transport.

There will be described hereinafter with reference to FIGS. 4 and 5 the forwardly and rearwardly located carrying members which, together with a mobile machine- or engine-carrier 1, constitute a wagon 26, the latter being shown in FIG. 3.

Here there will be seen two bogies, that is, a forward bogie 27 and a rear bogie 28, each having respective axle-trees 29 and 30, and 31 and 32, associated with respective frames 33 and 34, which form on their upper decks respective carrier support surfaces 35 and 36, and are terminated by respective buffers or stoppers 37 and 38.

Each carrier structure is equipped with at least two centering cones, such as 39 and 40, and a centrally located immobilization device such as 41 or 42, using pairs of respective studs 43 and 44, and 45 and 46, each pair constituting a respective blocking member, such as 47, which is movable along a transverse direction between a retracted position of rest, and an extended position of blockage. In the latter position each blocking member 47 constitutes a vertical abutment for the longitudinal rims of the support member 20, or pieces adjacent thereto, or for the beams forming the access ramps 7 and 8.

These blocking members 47 can be actuated by means of a common mechanism. The blocking members 47, in conjunction with the centering cones 39 and 40, assure a sufficient immobilization of the extremities of the trailer 1 and the bogie, so as to constitute a wagon which assures sufficient rigidity and cohesiveness for rail transport.

The centering cones fulfill a double function. Firstly, they assure lateral and longitudinal centering due to their position, but they also ensure the transmission of the pull or traction on the trailer and on the rear bogie.

As has already been indicated, if the lowering of the suspension is insufficient, the trailer includes at least one telescopic (non-illustrated) arm in the rear thereof.

There will be described hereinafter a conversion method between a road configuration and that of a railroad configuration.

The trailer is guided by the prime mover onto the rails, and is emplaced between a forward bogie and a rear bogie. The following operations are then carried out: the suspension is activated in the upper position; the pivoting mechanism with the prime mover is unlocked, the support arm is extended prior to its placement, and the extended arm is activated to disengage the connecting arm from the prime mover.

The prime mover then leaves the rail zone, and the trailer is left between the bogies.

Thereafter each rear access ramp is locked into a horizontal position.

The forward portion of the "swan neck" is then unlocked and lowered, and subsequently locked in that position onto the oblique abutment member at the base of the connecting arm by means of the existing rapid locking system 21.

Thereafter another bogie is supplied to the rear extremity of the trailer. The trailer's platform is then inclined forwardly by retraction of the support arm. The elevated rear of the trailer allows sufficient room for placement of the bogie, which is emplaced exactly below the ramps. Positions are then adjusted so that the centering cones face the cylindrical members provided on the ramps exactly.

The suspension is then eased by placing the wheels into the retracted position, or the rear arms are retracted so as to rigidize the ramps of the rear bogie by displacement of the members 47.

Subsequently the forward support arm is activated so as to raise the forward portion of the trailer. The centering cones of the carrier structure of the forward bogie are then emplaced exactly below the hollow cylindrical members, with which the prismatic support member is equipped.

The trailer level is then lowered by retracting the forward arm before it is retracted for its interior placement. The forward portion of the trailer is made rigid with the forward bogie by appropriate displacement of the members 47.

The trailer, thus immobilized and locked by means of its two extremities to the two bogies, is thus rigid therewith so as to constitute a wagon of sufficient cohesion, and so as to fulfill the conditions for railroad traffic.

The invention has been described in detail hereinabove. It will nevertheless be understood that various simple modifications, additions, variations, and substitutions by equivalent means will come within the scope of the present invention as outlined in the annexed claims. The use of reference numerals in the claims is purely illustrative, and by no means intended to limit the scope of the claims.

I claim:

1. A vehicle trailer, comprising:
   a deck-type framework for supporting an apparatus to be transported by said vehicle trailer;
   wheel means rotatably supported by said deck-type framework so as to render said vehicle trailer road-transportable by means of a tractor vehicle;
   ramp means pivotably mounted upon a rear end portion of said deck-type framework between a first position at which said ramp means engages a ground portion upon which said vehicle trailer is road-transportable so as to permit an apparatus to be loaded upon said vehicle trailer for subsequent transportation by said vehicle trailer, a second position at which said ramp means is retracted away from said ground so as to render said vehicle trailer road-transportable, and a third position at which said ramp means is operatively connected to a first railway bogie for supporting said rear end portion of said deck-type framework upon said first railway bogie; and
   a support arm pivotably mounted upon a forward end portion of said deck-type framework between a first position at which said support arm is operatively connected to said tractor vehicle so as to render said vehicle trailer transportable upon said ground by said tractor vehicle, and a second position at which said support arm is operatively connected to a second railway bogie such that said vehicle trailer is fixedly supported upon said first and second railway bogies when said ramp means is simultaneously connected to said first railway bogie whereby said vehicle trailer is transported upon said first and second railway bogies of a railway.

2. A vehicle trailer as set forth in claim 1, further comprising:
   means for locking said ramp means, pivotably mounted upon said rear end portion of said deck-type framework, at said third position so as to fixedly support said rear end portion of said deck-type framework upon said first railway bogie.

3. A vehicle trailer as set forth in claim 2, wherein said locking means comprises:
   first bracket means fixedly mounted upon said rear end portion of said deck-type framework and having first aperture means defined therein;
   second bracket means fixedly mounted upon said ramp means and having second aperture means defined therein for alignment with said first aperture means of said first bracket means of said deck-type framework when said ramp means is disposed at said third position; and
   bolt means for passage through said aligned first and second aperture means of said first and second bracket means for fixedly connecting said second bracket means of said ramp means to said first bracket means of said rear end portion of said deck-type framework whereby said ramp means are fixedly retained at said third position relative to said deck-type framework.

4. A vehicle trailer as set forth in claim 1, wherein:
   said forward end portion of said deck-type framework comprises a swan-neck connecting arm upon a forward end portion of which said support arm is pivotably mounted.

5. A vehicle trailer as set forth in claim 4, further comprising:
   means for locking said support arm, pivotably mounted upon said forward end portion of said swan-neck connecting arm, at both said first and second positions.

6. A vehicle trailer as set forth in claim 5, wherein said locking means comprises:
   first bracket means fixedly mounted upon said forward end portion of said swan-neck connecting arm and having first aperture means defined therein;
   second bracket means fixedly mounted upon a rear end portion of said swan-neck connecting arm within the vicinity of a junction defined between said swan-neck connecting arm and said deck-type framework and having second aperture means defined therein;
   third bracket means fixedly mounted upon a forward end portion of said support arm and having third aperture means defined therein for alignment with said second aperture means of said second bracket means of said swan-neck connecting arm when said support arm is disposed at said second position;

fourth bracket means fixedly mounted upon a rear end portion of said support arm and having fourth aperture means defined therein for alignment with said first aperture means of said first bracket means of said swan-neck connecting arm when said support arm is disposed at said first position; and bolt means for passage through said aligned second aperture means of said second bracket means and said third aperture means of said third bracket means for fixing said support arm at said second position so as to be operatively connected to said tractor vehicle, and for passage through said aligned fourth aperture means of said fourth bracket means and said first aperture means of said first bracket means for fixing said support arm at said first position so as to be operatively connected to said second railway bogie.

7. A vehicle trailer as set forth in claim 1, further comprising:

upstanding centering cones fixedly mounted upon an upper deck portion of said second railway bogie; and hollow cylindrical members fixedly disposed upon said support arm for mating with said upstanding centering cones of said second railway bogie so as to connect said support arm to said second bogie.

8. A vehicle trailer as set forth in claim 1, further comprising:

upstanding centering cones fixedly mounted upon an upper deck portion of said first railway bogie; and hollow cylindrical members fixedly disposed upon said ramp means for mating with said upstanding centering cones of said first railway bogie so as to connect said ramp means to said first railway bogie.

9. In combination, a vehicle system comprising:

a tractor vehicle;

a trailer vehicle which includes a deck-type framework for supporting an apparatus to be transported by said trailer vehicle, and wheel means rotatably supported by said deck-type framework so as to render said trailer vehicle road-transportable by means of said tractor vehicle when said trailer vehicle is operatively connected to said tractor vehicle;

a first railway bogie;

a second railway bogie;

ramp means pivotably mounted upon a rear end portion of said deck-type framework between a first position at which said ramp means engages a ground portion upon which said trailer vehicle is road-transportable so as to permit an apparatus to be loaded upon said trailer vehicle for subsequent transportation by said trailer vehicle, a second position at which said ramp means is retracted away from said ground so as to render said trailer vehicle road-transportable, and a third position at which said ramp means is operatively connected to said first railway bogie for supporting said rear end portion of said deck-type framework upon said first railway bogie; and a support arm pivotably mounted upon a forward end portion of said deck-type framework between a first position at which said support arm is operatively connected to said tractor vehicle so as to render said vehicle trailer transportable upon said ground by said tractor vehicle, and a second position at which said support arm is operatively connected to said second railway bogie such that said trailer vehicle is fixedly supported upon said first and second railway bogies when said ramp means is simultaneously connected to said first railway bogie whereby said trailer vehicle is transported upon said first and second railway bogies of a railway.

10. The combination as set forth in claim 9, further comprising:

means for locking said ramp means, pivotably mounted upon said rear end portion of said deck-type framework, at said third position so as to fixedly support said rear end portion of said deck-type framework upon said first railway bogie.

11. The combination as set forth in claim 10, wherein said locking means comprises:

first bracket means fixedly mounted upon said rear end portion of said deck-type framework and having first aperture means defined therein;

second bracket means fixedly mounted upon said ramp means and having second aperture means defined therein for alignment with said first aperture means of said first bracket means of said deck-type framework when said ramp means is disposed at said third position; and bolt means for passage through said aligned first and second aperture means of said first and second bracket means for fixedly connecting said second bracket means of said ramp means to said first bracket means of said rear end portion of said deck-type framework whereby said ramp means are fixedly retained at said third position relative to said deck-type framework.

12. The combination as set forth in claim 9, wherein:

said forward end portion of said deck-type framework comprises a swan-neck connecting arm upon a forward end portion of which said support arm is pivotably mounted.

13. The combination as set forth in claim 12, further comprising:

means for locking said support arm, pivotably mounted upon said forward end portion of said swan-neck connecting arm, at both said first and second positions.

14. The combination as set forth in claim 13, wherein said locking means comprises:

first bracket means fixedly mounted upon said forward end portion of said swan-neck connecting arm and having first aperture means defined therein;

second bracket means fixedly mounted upon a rear end portion of said swan-neck connecting arm within the vicinity of a junction defined between said swan-neck connecting arm and said deck-type framework and having second aperture means defined therein;

third bracket means fixedly mounted upon a forward end portion of said support arm and having third aperture means defined therein for alignment with said second aperture means of said second bracket means of said swan-neck connecting arm when said support arm is disposed at said second position;

fourth bracket means fixedly mounted upon a rear end portion of said support arm and having fourth aperture means defined therein for alignment with said first aperture means of said first bracket means of said swan-neck connecting arm when said support arm is disposed at said first position; and bolt means for passage through said aligned second aperture means of said second bracket means and said third aperture means of said third bracket means for fixing said support arm at said second position so as to be operatively connected to said tractor vehicle, and for passage through said aligned fourth aperture means of said fourth bracket means and said first aperture means of said first bracket means for fixing said support arm at said first position so as to be operatively connected to said second railway bogie.

15. The combination as set forth in claim 9, further comprising:

upstanding centering cones fixedly mounted upon an upper deck portion of said second railway bogie; and hollow cylindrical members fixedly disposed upon said support arm for mating with said upstanding centering cones of said second railway bogie so as to connect said support arm to said second railway bogie when said support arm is disposed at said second position.

16. The combination as set forth in claim 9, further comprising:

upstanding centering cones fixedly mounted upon an upper deck portion of said first railway bogie; and hollow cylindrical members fixedly disposed upon said ramp means for mating with said upstanding centering cones of said first railway bogie so as to connect said ramp means to said first railway bogie when said ramp means is disposed at said third position.

* * * * *